April 22, 1952  W. J. VIDAVER  2,593,815
ARTIFICIAL TEETH
Filed March 6, 1951

INVENTOR.
William J. Vidaver
BY Daniel G. Cullen
Attorney

Patented Apr. 22, 1952

2,593,815

UNITED STATES PATENT OFFICE 2,593,815

ARTIFICIAL TEETH

William J. Vidaver, Detroit, Mich.

Application March 6, 1951, Serial No. 214,117

3 Claims. (Cl. 32—8)

This application relates to artificial teeth and more particularly improvements in metallic cutting inserts for such teeth, especially when such teeth are of the type known as "plastic" teeth.

It has been proposed to incorporate in artificial tooth bodies of relatively soft material, such as synthetic resins, metallic cutting inserts having edges exposed on the occlusal surfaces of the teeth to define thin, sharp cutting edges on such occlusal surfaces. However, the proposals thus far made and known to me have not prove satisfactory and a particular object of the present invention is to provide an improved form of metal insert for artificial teeth.

The characteristics and advantages of the improved form of metal insert for artificial teeth that I have invented are described in the following specification which can best be understood upon reference to the appended drawing.

Figure 1:
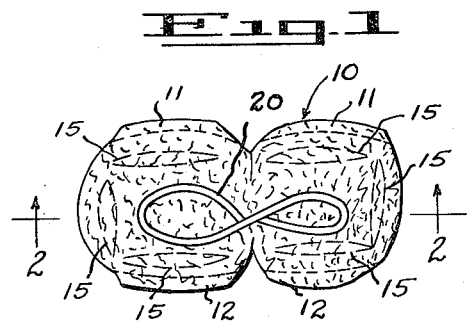
Fig. 1 is a top plan view of a conventionally shown lower molar artificial tooth having a metal insert of my improved form disposed in the tooth body.
Figure 2:
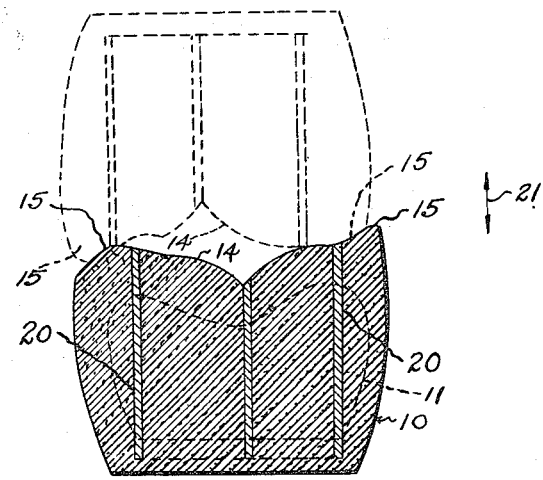
Fig. 2 is an elevational section view as if on line 2—2 of Fig. 1, with an upper molar shown in dotted lines.

Referring to the drawing, it will be observed that it shows an artificial tooth body 10 of atypical lower molar form, but otherwise generally of conventional form. It is atypically characterized by the provision of portions 11 and 12 defined by dotted lines which belly out the tooth a typically on buccal and lingual surfaces for extraordinarily spacing the cheek or tongue from the center portion of the occlusal surfaces 14 of the tooth body.

It may here be noted that the dotted lines of the drawing indicate the outline of a typical tooth, whereas the full lines, including the bellying out portions 11 and 12, show the outline or contour of an atypical tooth.

Such a tooth has the conventional cusp areas 15 on the occlusal surface.

In the tooth body is a metal ribbon insert 20 whose specific characteristics will now be outlined.

First, the insert is disposed upright in the tooth body so as to be parallel to the axis or direction of occlusion which, according to the drawing, is a truly vertical line 21. Consequently, during the grinding action of the tooth which removes as much as forty per cent of the height or depth of the tooth, the uprightness or vertical positioning of the insert will insure the maintenance of a sharp cutting edge at all times on the occlusal surface of the tooth. The same shape or form of cutting edge is constantly disposed to the occlusal surface regardless of the wear of the tooth.

Also, because the insert is upright on an axis parallel to the axis of occlusion, occlusal forces will create no side thrusts on the insert to tend to dislodge it, but occlusal forces, on the contrary, will constantly tend to maintain the insert deep in its proper position in the tooth, preventing dislodgement, as distinguished from promoting dislodgement of such insert.

Second, the inserts are of uniform cross-section ribbon so that the shape of the insert and the form of its cutting edge is constant despite wear of the tooth. Also, because it is made of uniform cross-section ribbon, the insert can be made manually from ribbon stock using hand tools and formed to the desired shape and the desired finished size and dimension and then either molded into the tooth or inserted into a formed groove of the tooth. This is a much simpler operation than casting the insert or otherwise forming it.

Third, the insert is remote from and centrally interior of the occlusal cusp areas 15 of the tooth body, rather than in alinement with such cusp areas 15 or even, as has been proposed, outside of such cusp areas 15. Consequently, the inserts are considerably spaced from the outer surfaces of the tooth body and thus from the cheek and tongue to minimize contact between the inserts and such cheek or tongue.

In addition, since the insert is quite remote from the outside surfaces of the tooth body, it will not cast shadows through the tooth body, usually of some degree of translucency, and thus will not discolor the tooth.

Further, spacing the insert inside the cusps prevents the insert from having a substantial shearing action on the buccal cusps of opposing molars, a feature militating against satisfactory performance of insert forms heretofore proposed, where the inserts were either at the outer cusps or outside of such cusps.

Spacing the insert inside the cusps, and particularly disposing it on an upright axis parallel to the axis of occlusion, insures the provision of sufficient tooth body outside of the insert to provide a strong tooth. If the insert were at or outside the cusps, only a thin part of the tooth body would be outside of the insert and thus the insert would not be backed up by sufficient tooth body to insure adequate strength of the tooth body. In such a tooth body there would soon be chipping of the tooth body on the outside of the insert. This is not as likely with the construction herein described where the insert is well within the cusps.

Fourth, the insert hereof extends almost completely the full depth or height of the tooth body and thus is not as likely to be dislodged or to wear down as inserts set down into the tooth body only slightly inside the occlusal surfaces.

The insert shown is of figure 8 form with the ends of the ribbon forming the insert meeting at the center of the figure 8, to provide two complete loops, whereby stresses are transferred from one part of the tooth body to another through the loops of the insert, thus equalizing and distributing stresses.

In forming the tooth, the tooth body may be molded around the insert, if desired, or the tooth body may be formed with a uniform cross-section groove into which a uniform cross-section insert may be inserted and cemented in place. A third desirable way is to soften a tooth and press an insert into it.

Now having described the artificial tooth shown in the drawing, reference should be had to the claims which follow.

I claim:

1. An artificial tooth comprising a tooth body having an occlusal surface of anatomical form provided with anatomically positioned occlusal cusps and a central valley surrounded by such cusps, and a metal insert therein having a uniform cross-section and having a thin sharp cutting edge exposed in the central valley only, remote from the cusps, said insert being disposed upright in the tooth body so as to be parallel to the axis of occlusion and extending substantially the full depth of the tooth body.

2. An artificial tooth comprising a tooth body having an occlusal surface of anatomical form provided with anatomically positioned occlusal cusps and a central valley surrounded by such cusps, and a metal insert therein having a uniform cross-section and having a thin sharp cutting edge exposed in the central valley only, remote from the cusps, said insert being disposed upright in the tooth body so as to be parallel to the axis of occlusion and extending substantially the full depth of the tooth body, the tooth body being bellied out laterally and atypically on its sides for extraordinarily spacing the cheek or tongue from the central valley of the occlusal surface of the tooth body.

3. An artificial tooth comprising a tooth body having an occlusal surface of anatomical form provided with anatomically positioned occlusal cusps and a central valley surrounded by such cusps, and a metal insert therein having a uniform cross-section and having a thin sharp cutting edge exposed in the central valley only, remote from the cusps, said insert being disposed upright in the tooth body so as to be parallel to the axis of occlusion and extending substantially the full depth of the tooth body, the tooth body being bellied out laterally and atypically on its sides for extraordinarily spacing the cheek or tongue from the central valley of the occlusal surface of the tooth body, said insert being generally of figure 8 contour, with the ends thereof at the center of the figure 8.

WILLIAM J. VIDAVER.

REFERENCES CITED

The following references are of record in the file of this patent:

UNITED STATES PATENTS

| Number | Name | Date |
|---|---|---|
| 1,753,644 | Burden | Apr. 8, 1930 |
| 2,295,264 | Prange | Sept. 15, 1942 |
| 2,397,407 | Butler | Mar. 26, 1946 |